United States Patent

Eggert, Jr.

[15] 3,639,934

[45] Feb. 8, 1972

[54] CANOPY APPARATUS

[72] Inventor: Walter S. Eggert, Jr., Huntingdon Valley, Pa.

[73] Assignee: Boothe Airside Services, Inc.

[22] Filed: Sept. 25, 1969

[21] Appl. No.: 860,882

[52] U.S. Cl. ..............................................................14/71
[51] Int. Cl. ........................................................B65g 11/00
[58] Field of Search ......................................14/71, 72; 135/5

[56] References Cited

UNITED STATES PATENTS

| | | |
|---|---|---|
| 3,099,847 | 8/1963 | Lodjic..........................................14/71 |
| 3,121,243 | 2/1964 | Phillips........................................14/71 |
| 3,310,823 | 3/1967 | Preiss..........................................14/71 |
| 3,363,273 | 1/1968 | Chitwood....................................14/71 |
| 3,369,264 | 2/1968 | Kurka..........................................14/71 |
| 3,479,677 | 11/1969 | Burns..........................................14/71 |
| 3,484,883 | 12/1969 | Van Marle...................................14/71 |

*Primary Examiner*—Nile C. Byers, Jr.

[57] ABSTRACT

A flexible canopy extendable from an aircraft passenger transfer vehicle for mating with passenger airplanes having different fuselage airfoil shaped configurations. The gangway includes a rigid upright frame which carries a pivotal bow frame from its upright sides and includes a lower frame having a threshold plate which is extendable from the gangway. The lower frame includes a crossbar which is connected to the upper bow frame and includes bumpers which encircle the doorway opening in the aircraft. The frames stretch a flexible bellows around the gangway to keep out wind and weather.

17 Claims, 5 Drawing Figures

PATENTED FEB 8 1972

INVENTOR.
WALTER S. EGGERT, JR.

BY

William R. Nolte

AGENT

INVENTOR.
WALTER S. EGGERT, JR.
BY
William R. Nolte
AGENT

CANOPY APPARATUS

This invention has utility for a vehicle of the type described in application, Ser. No. 762,443 to James M. Herring entitled "Aircraft Transfer Vehicle" now U.S. Pat. No. 3,537,745 and assigned to the same assignee as the present invention. The vehicle described therein is of a configuration of that of a four-wheel chassis with a front axle which is pivoted about a longitudinal horizontal center pivot and a rigid rear axle. Vertical centerline masts, one above each axle, acts as guides and supports for a passenger pod supported of a lifting screw at each mast. The front end of the pod has a doorway with a rotating and extending gangway of the type described in Ser. No. 850,142 to Walter S. Eggert, Jr. entitled "Bellows Construction" now U.S. Pat. No. 3,544,626. In a typical loading cycle, the vehicle of the above-described application can be elevated at the aircraft terminal to receive passengers and then lowered and locked to the chassis for travel to the parked aircraft. In order to discharge the passengers, the passenger pod is elevated and the nose of the pod with its bellows construction is mated with the doorway opening of the parked aircraft. Due to the fact that present day aircraft are of enormous size and of wide fuselage configurations difficulty in securing good mating alignment is experienced.

Accordingly it is the principal object of this invention to provide a canopy mating apparatus which avoids one or more of the disadvantages of prior art constructions.

It is a further object of this invention to provide an improved canopy apparatus which is capable of operating in mating relation with a wide variety of fuselage configurations.

In accordance with the invention, the canopy apparatus for an aircraft passenger transfer vehicle comprises gangway means mounted for movement between a retracted position within the vehicle to an extended position. The gangway means includes upright frame means rigidly secured thereto with bow frame means mounted to the upright frame means for movement in an arcuate path. Means are provided for moving the bow frame means. The apparatus also includes walkway means which are mounted for extension and retraction relative to the gangway means. The walkway means further includes lower frame means and additional means connect the bow frame means and the lower frame means so that pivotal movement of the bow frame means induces vertical pivotal movement of the lower frame means. Bumper means are also provided on the bow frame, the lower frame and the interconnecting means to make contact at the marginal edges of the doorway of the parked aircraft.

For a better understanding of the present invention together with other and further objects thereof reference is had to the following description taken in connection with the accompanying drawings.

Figure 1:
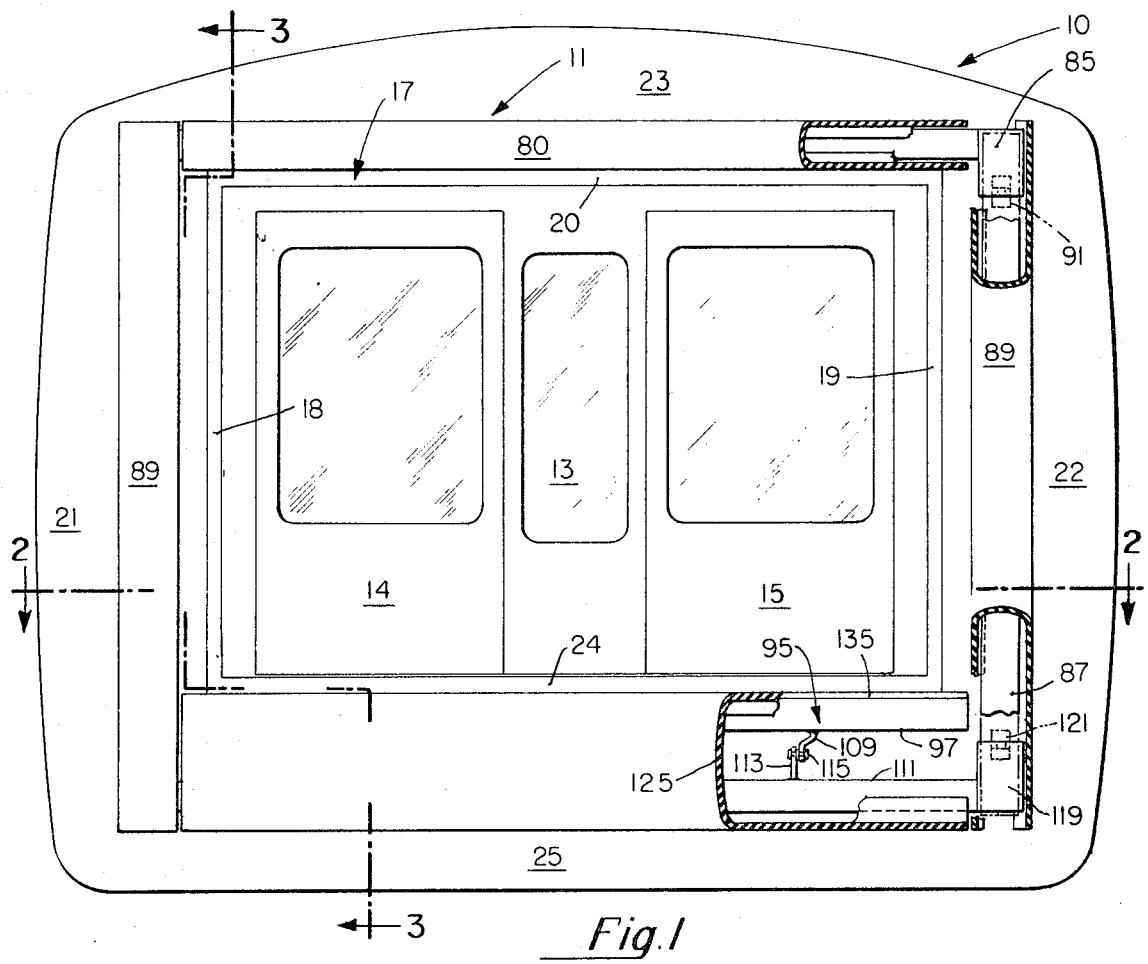
FIG. 1 is a front elevational view of a vehicle embodying the canopy apparatus of the present invention.
Figure 2:
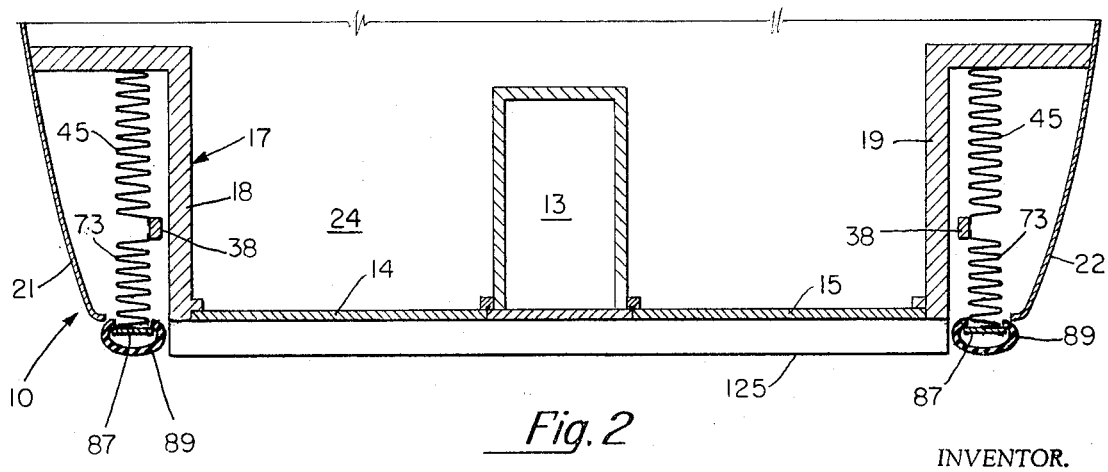
FIG. 2 is a sectional view taken along the lines 2—2 of FIG. 1.

Referring now to FIG. 1 there is shown a vehicle 10 embodying a canopy apparatus 11. The vehicle is provided with an operator's cab 13 located along the longitudinal centerline of the vehicles. Passengers are loaded and unloaded from two side doors 14 and 15 disposed on either side of the cab. As seen in FIG. 2 the front portion of the vehicle includes a collarlike portion 17 having sidewalls 18, 19, a top portion 20 and a floor portion 21 which is contiguous with the main interior floor portion of the vehicle. The canopy apparatus is sandwiched between the upright sidewall portions 18, 19 of the collar and the outer upright fairing shroud walls 21 and 22 forming part of the outer sidewall skin of the vehicle. In addition the top part of the canopy 11 as seen in FIG. 1 and also FIG. 3 lies beneath a roof shroud portion 23, whereas the lower portion of the apparatus 11 is enclosed by a bottom closure portion 25.

Figure 3:
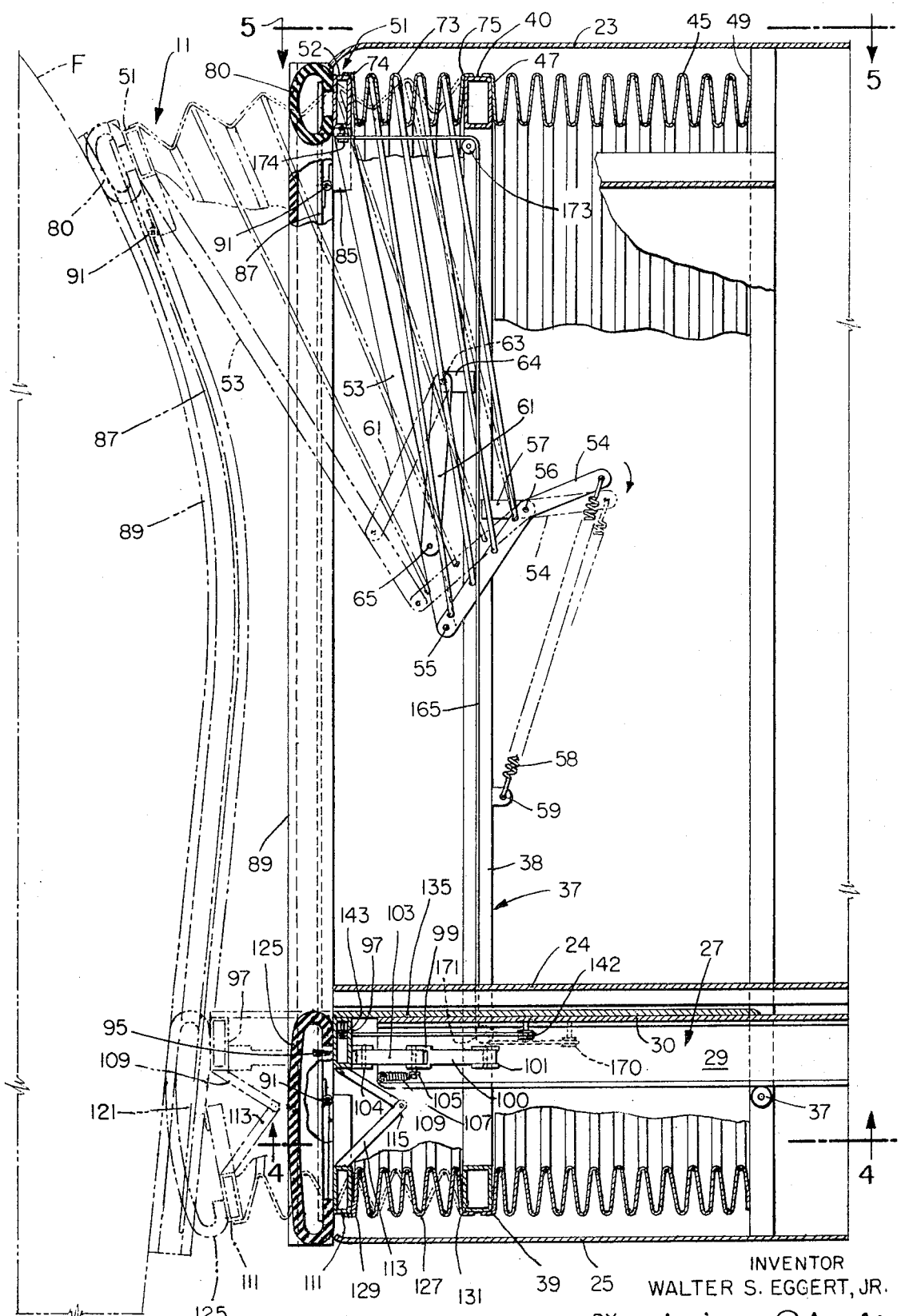
FIG. 3 is a vertical elevational sectional view taken along the lines 3—3 of FIG. 2.
Figure 4:
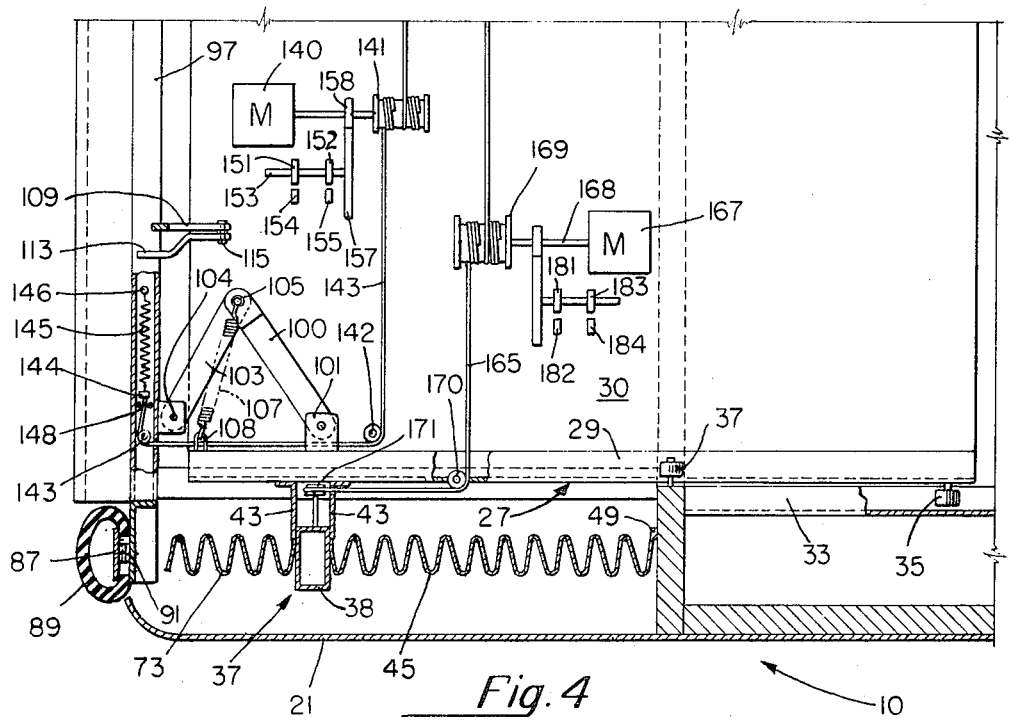
FIG. 4 is a view taken from beneath the gangway apparatus along the lines 4—4 of FIG. 3.

With reference now to FIGS. 3 and 4, gangway carriage means 27 are mounted for sliding longitudinal movement beneath the floor 24 of the vehicle and its outer shroud 25. The carriage means 27 includes a pair of spaced parallel beams 29 (only one of which is shown in FIG. 4) and a floor surface 30 which spans the spaced beams. The vehicle 10 includes an underfloor frame with spaced channel tracks 33 which receive roller means 35 mounted to the beam 29 of the carriage. The rollers project outwardly from the beams and are received with the flanges of the track 33. The underframe of the vehicle further includes rollers 37 which underlie the beams 29 and provide additional longitudinal rolling support for the carriage means 27. The carriage gangway 27 includes a rigid rectangular frame 37 in the form of a horse-collar which completely encircles the gangway 27. The frame 37 includes upright side portions 38, a bottom transverse connecting bar portion 39 and a top transverse bar portion 40 which interconnects the ends of the upright side portions 38. The rectangular frame 37 is secured to the carriage gangway means 27 by means of brackets 43 (FIG. 4) affixed to opposite sides of the gangway. An inner bellows 45 is connected to the rear marginal edge portions 47 of the rigid rectangular frame 37 and its opposite end to the front portion of the vehicle as at 49. As the carriage gangway is extended or retracted the bellows is likewise extended and retracted in the manner shown and described in FIG. 1 and 2 of the aforementioned application, Ser. No. 850,142 to Walter S. Eggert, Jr. entitled "Bellows Construction."

Figure 5:
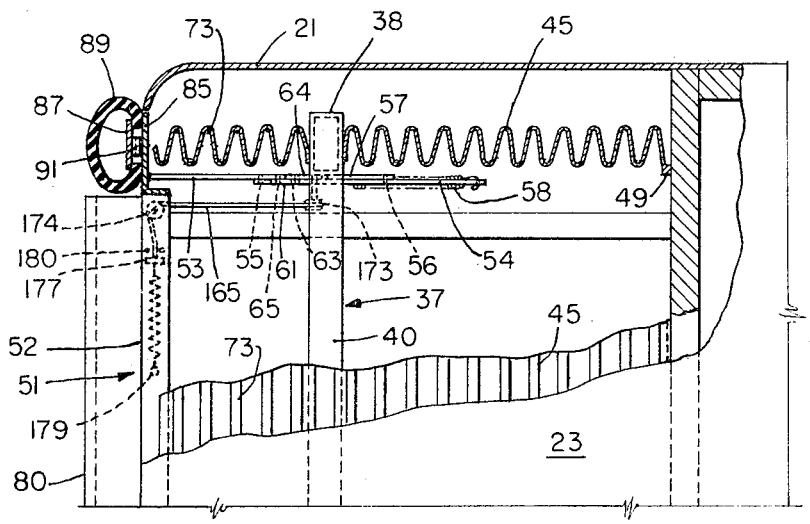
FIG. 5 is a view partially broken away and showing the top portion of the canopy apparatus and taken along the lines 5—5 of FIG. 3.

Referring now to FIGS. 3, 4 and 5, the canopy apparatus 11 of the present invention includes upper bow frame means 51 pivotally mounted to the upright frame arms 38 of rigid frame 37. The bow frame means 51 comprises an upper horizontally disposed bar 52 which extends across the full width of the vehicle. The opposite side of the bow frame includes a like arm 52, not shown. A lever arm 54 is pivotally connected as at 55 to the lower end of side arm 53. The lever 54 is mounted for rotation about a pivot intermediate its ends as at 56 to a supporting block 57 rigidly connected to the upright side post 38 of frame 37. A coiled tension spring 58 is connected at its upper end to the opposite end of lever 54 and at its lower end to a lower supporting projecting block 59 affixed to post 38. A second lever 61 is affixed at its upper end for pivotal movement as at 63 to block 64 projecting from the opposite side of post 38 away from block 57. The lower end of lever 61 is connected by pivot 65 upwardly from the lower pivot connection 55 of side bar 53.

A plurality of upwardly extending links 70, 71 and 72 are pivotally secured at their lower ends to lower lever 54, and at their upper ends along the upper fold lines of outer bellows 73. The bellows are secured at their forward edge to rear upper marginal edge of the top horizontal member 52 of the bow frame 51 as at 74 and at its rear edge to the top horizontal member 40 of upright frame 37 as at 75. The front face of the horizontal bow frame member 52 carries a bumper member 80 of elastic material suitably affixed to the front face of the member. The latter member is adapted to contact a portion of a fuselage F of a parked aircraft above a doorway opening in such aircraft. The aforementioned lever tension spring 58 is connected to rotate the lower lever 54 in a clockwise direction. Since the lower ends of the side arms 53 of the bow frame 51 are connected to links 54 such rotation in a clockwise direction will cause the bow frame to move and carry the blocks 73 in a counterclockwise direction. The force of contact pressure of the bumper 80 with aircraft of differently shaped fuselages will be substantially constant. This follows because the mechanical advantage of the linkage increases with the clockwise rotation of link 54 as the tension of spring 58 decreases with such rotation. This motion is illustrated in FIG. 3 wherein link 54 is rotated by spring 58 from its full line position to its dotted line position. The top horizontal member 52 of bow frame 51 is as a consequence caused to translate forwardly and downwardly.

As seen in FIG. 5 and FIG. 1, the outer ends of horizontal bar 52 of bow frame 51 includes a bracket plate 85 which extends downwardly therefrom. As the bow frame 51 pivots about upright post 38 the bracket 85 is carried in such swinging motion. The bracket carries a strap member 87 which in turn carries a vertical bumper member 89. As seen in FIG. 1 a like vertical bumper member 89 is provided adjacent the vertical side of the doorway 15. As seen in FIG. 3, the lower end of the bracket 85 carries a hinge member 91 to which the aforementioned vertical strap member is secured.

Referring now to FIGS. 3 and 4, threshold frame means 95 are provided forwardly of the carriage means 27 and at the same general elevation thereof. The threshold frame means include a transverse rectangular frame member 97 which extends across the front of the gangway means 27. Hinge means 99, comprising a first hinge arm 100 is mounted for pivotal movement to the side frame channel member 29 by means of pivot support 101. A second link member 103 is mounted for pivotal movement to the back face of transverse bar 97 as at 104. Link 100 is connected to link 103 by means of pivot 105. Spring means 107 connected at one end to pivot 105 and at its opposite end as at 108 to the frame member 29 normally urges the threshold frame member 97 out forwardly of the gangway carriage frame means 27. A rigid arm 109 projects from the rear face of the transverse threshold frame member. As seen in FIG. 3 and FIG. 1, a lower transverse frame member 111 is positioned directly beneath the transverse threshold frame member 97. The lower frame 111 includes an arm 113 projecting rearwardly and upwardly therefrom and is pivotally connected as at 115 to the aforementioned arm 109. The transverse lower frame member 111 is slightly wider than the threshold frame member 95, FIG. 1, and is of a width to permit its attachment to the downwardly depending aforementioned straps 87. For this purpose the outer ends of the transverse lower frame 111 include upwardly projecting outer end portions 119. As seen in FIG. 1 the lower extremities of straps 87 overlap the front face portion of the upwardly projecting end portion 119, being secured thereto by means of hinge elements 121. A transverse bumper member 125 is connected along its top edge to the front face of the threshold frame member 95 and at its lower edge along the front face of the lower frame 111. The bumper 125 is of a material of the type used in bumpers 23 and 89. The lower frame member 111 by virtue of pivots 115 is enabled to pivot relative to the upper transverse threshold frame 97 depending upon the contour of the fuselage of the aircraft which is being contacted by the canopy mating apparatus. The forward bellows apparatus 73 includes a bottom portion 127 which is affixed to the rear face of the lower frame member 111 as at 129 and to the forward face of the horse-collarlike frame 37 as at 131. A threshold plate 135 is affixed to the top surface of the transverse threshold frame 97 as at 137 and overlies the floor 30 of the gangway carriage 27.

Referring now to FIG. 4, a motor 140 is shown in driving relationship with a drum 141. A cable 143 is connected at one of its ends to the drum 141 and then traverses a pulley 142 affixed to the channel floor beam 29 and thereafter a second pulley 143 attached to the threshold frame 97. The cable 143 serves to retract the transverse threshold frame 97 against the outward urging thereof by spring 107 connected to the links 103 and the cable 100. The cable 143 at its forward end is connected to a movable abutment 144 affixed to spring 145. The spring is anchored at its opposite end as at 146. The spring 145 normally exerts a tension on the end of the cable 143 to remove any slack from it. As the drum 141 is wound in one direction the cable 143 which extends around pulleys 142 and 143 connected to the transverse frame 97, will stretch spring 145 so that the stop 144 on the cable engages a fixed stop 148 on the threshold frame. As drum 141 is turned further the frame 97 will be moved rearwardly against the action of spring 107. If it is desired to permit the threshold frame to move outwardly away from the carriage gangway 29, the drum 141 is permitted to unwind the cable 143 and thus the spring 107 is permitted to push the transverse threshold frame 97 outwardly. In order to control the extent of movement of cable 143, cam means 151, 152 mounted on shaft 153 engage respectively limit switches 154 and 155. The shaft 153 carries a gear 157 which meshes with the stub gear 158 rotated by the motor shaft of motor 140.

Referring now to FIGS. 3, 4 and 5, the pivotal action of the bow frame 51 is likewise controlled by cable means 165. The cable 165 is utilized to overcome the action of spring 58 which normally urges the upper canopy via the bow frame 51 in a forward and downwardly direction. As seen in FIG. 4 a motor 167 by means of its shaft 168 drives a cable drum 169 to which one end of the cable 165 is attached. The cable thereafter traverses a pulley 170 mounted on channel floor frame 29 and then changes direction to a second pulley 171 secured to the lower end of upright frame 38, see FIG. 3. The cable then travels vertically parallel to the vertical side frame 38 to its top portion where it encircles an upper pulley 173 likewise affixed to the face of side post 38. Thereafter cable 165 travels forwardly and encircles a further pulley 174 which is mounted to the transverse bow frame member 52 and connects to the stop member 177 affixed to one end of slack tension spring 178. The other end of the spring is affixed to the bow member as at 179. An abutment 180 is provided to limit the movement of stop member 177 affixed to the spring. Normally as the cable is moved in one direction the spring is stretched until the stop 177 coacts with abutment 180. Thereafter the bow frame 51 is pulled rearwardly against the action of spring 58, FIG. 3. This movement will continue until the motor 167 is shut off by cam 181 which operates switch 182. Upon reverse rotation of the motor 167 the cable is played out and the bow spring 58 urges the bow frame 51 to translate forwardly and downwardly. The extent of forward travel of the cable is limited by cam 183 which operates switch 184 to stop the motor.

From the foregoing description it is seen that when it is desired to mate with a parked aircraft F, the gangway 27 may be extended a predetermined desired amount. Thereafter the threshold frame 95 is permitted to move forwardly until the lower transverse bumper 125 coacts with the fuselage surface F of the aircraft. This is accomplished by energizing motor 140 thereby enabling cable drum 141 to play out cable 143, FIG. 4. Spring 107 actuates links 100, 103 thus extending transverse threshold frame 97 until the bumper 125 conforms to the fuselage. Thereafter the bow frame 51 is enabled to translate forwardly and downwardly. To accomplish this, motor 167 is energized in a manner to enable drum 169 to play out a length of cable 165, FIG. 4. The slack so provided in the cable enables spring 58, FIG. 3, to rotate links 54 in a clockwise direction about pivot 56. This motion in turn causes the bow frame 51 to translate and rotate in a counterclockwise direction. The latter motion will continue until the bumper so affixed to the bow frame is compressed against the top portions of the fuselage. Since the outer sides of the bow frame carry side bumper 98 by means of straps 87 the side bumpers are likewise caused to conform to the fuselage. Moreover, since the lower ends of the straps 87 are connected to lower frame 111, the latter is caused to pivot about pivot 115 to thereby enable the lower portion of the side bumpers to conform to the fuselage. The weight of the lower frame 111 as well as a portion of the weight of the lower transverse bumper 125 carried by it operates to maintain the straps 87 in tension to achieve conformity of bumpers 89 with the fuselage. Passengers are thereby enabled to transfer from one vehicle to another via the gangway in an enclosed weathertight construction.

While there has been described what at present is considered to be the preferred embodiment of the invention, it will be obvious to those skilled in the art that various changes and modifications may be made therein without departing from the invention, and it is therefore aimed in the following claims to cover all such changes and modifications as fall within the true spirit and scope of the invention.

What is claimed is:

1. Canopy apparatus for a vehicle having a body, said canopy apparatus comprising gangway means, means mounting said gangway means for movement between a retracted position within said vehicle body to an extended projecting position therefrom, upright frame means supported on said gangway means, bow frame means, means pivotally mounting said bow frame means on said upright frame means, means for pivotally moving said bow frame means relative to said upright frame, threshold frame means, means mounting said threshold frame means for movement toward and away from said gangway means, means for moving said threshold means relative to said bow frame means, threshold plate means supported between said gangway means and said threshold frame means, and bumper seal means mounted on said bow frame means and lower bumper means mounted on said threshold frame means.

2. In the canopy apparatus as set forth in claim 1 and means including lower frame means, including pivot means mounting said lower frame means to said threshold means for movement toward and away from said threshold plate means.

3. In the canopy apparatus as set forth in claim 2 and including lower bumper means interconnected to said lower frame means.

4. In the canopy apparatus as set forth in claim 3, and including means connecting said bow frame means to said lower frame means whereby pivotal movement of said bow frame means cause pivotal movement of said lower frame means relative to said threshold frame means.

5. In the canopy apparatus as set forth in claim 4 and including bumper means connected to said means connecting said bow frame means to said lower frame means.

6. In the canopy apparatus as set forth in claim 5 wherein said means connecting said bow frame means to said lower frame means constitute strap hanger means having a top portion overlapping said bow frame means and a lower portion overlapping said lower frame.

7. In the canopy apparatus as set forth in claim 6 and including upper hinge means connecting said top portion to said bow frame and enabling pivotal separation of said top portion from said bow frame, and lower hinge means connecting said lower portion to said lower frame means enabling said lower portion to separate from said lower frame means.

8. In the canopy apparatus as set forth in claim 1 wherein said vehicle body includes a face portion with said gangway means projecting therefrom, and wherein first bellows means are interconnected between said rigid upright frame means and said face portion of said vehicle body.

9. In the canopy apparatus as set forth in claim 8 and including second bellows means interconnected with said upright frame means at one of its ends and to said bow frame and said lower frame at its other end.

10. In the canopy apparatus as set forth in claim 1 and including lever means connecting said bow frame means to said upright frame means, and spring means connected to said lever means to normally urge said second bellows means forwardly of said upright frame means.

11. In the canopy apparatus as set forth in claim 10 and including a plurality of rib link means connected at one end to said lever means and at their other ends to said second bellows means.

12. Closure apparatus for a passenger walkway having a floor and upright side members for mating engagement with a structure at the margins of a doorway opening therein, comprising in combination, canopy means, mechanical linkage means mounting said canopy means to said side members, spring means connected to said mechanical linkage means to cause a forward excursion of said canopy means thereof, restraining means operatively associated with said canopy means for opposing said spring means for controlling said forward excursion, said mechanical linkage means being normally restrained by said restraining means in a retracted position, and wherein said restraining means include drive means whereby operation of said drive means in one direction enables forward excursion of said mechanical linkage means by the urging of said spring means.

13. Closure apparatus for a passenger walkway having a floor and upright side members for mating engagement with a structure at the margins of a doorway opening therein comprising in combination canopy means, mechanical linkage means mounting said canopy means to said side members, spring means connected to said mechanical linkage means to cause a forward excursion thereof, restraining means operatively associated with said canopy means for controlling said forward excursion, said mechanical linkage means having a mechanical advantage which increases with said forward excursion, and wherein the force of said spring means decreases with said forward excursion to thereby cause a constant application of force by the canopy means with said structure irrespective of the extent of said forward excursion of said mechanical linkage means.

14. Closure apparatus for a passenger walkway having a floor and upright side members for mating engagement with a structure at the margins of a doorway opening therein, comprising in combination, canopy means, mechanical linkage means mounting said canopy means to said side members, spring means connected to said mechanical linkage means to cause a forward excursion thereof, restraining means operatively associated with said canopy means for opposing said spring means for controlling the extent of said forward excursion, threshold frame means, said mechanical linkage means including lower linkage means, additional spring means urging said lower linkage means to cause forward excursive movement thereof, and wherein said restraining means include means to oppose said additional spring means to control the extent of said forward excursive movement.

15. Canopy apparatus for a walkway for mating engagement with a structure comprising threshold frame means, means for mounting said threshold frame means on an end of said walkway for movement between retracted and extended positions from the end thereof, plate means supported between said walkway and said threshold frame means, said means for mounting including resilient means disposed between said walkway and said threshold frame means to exert a relatively constant pressure within a predetermined range for different extended positions of said threshold frame means when it is urged into contact with said structure.

16. In the invention set forth in claim 15, wherein said means for mounting include a pair of links connected between said threshold frame means and said walkway.

17. In the invention set forth in claim 16, wherein said resilient means include spring means connected to said pair of links to normally urge said links to extended positions.

* * * * *